US009749336B1

(12) United States Patent
Zhang et al.

(10) Patent No.: US 9,749,336 B1
(45) Date of Patent: Aug. 29, 2017

(54) MALWARE DOMAIN DETECTION USING PASSIVE DNS

(71) Applicant: Palo Alto Networks, Inc., Santa Clara, CA (US)

(72) Inventors: Yanxin Zhang, San Ramon, CA (US); Xinran Wang, San Ramon, CA (US); Huagang Xie, Pleasanton, CA (US); Wei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 13/778,001

(22) Filed: Feb. 26, 2013

(51) Int. Cl.
*H04L 29/06* (2006.01)
*H04L 29/12* (2006.01)
*G06F 17/30* (2006.01)

(52) U.S. Cl.
CPC .......... *H04L 63/14* (2013.01); *H04L 63/1416* (2013.01); *H04L 63/1441* (2013.01); *G06F 17/30958* (2013.01); *H04L 29/12066* (2013.01)

(58) Field of Classification Search
CPC ............ H04L 63/1441; H04L 63/1416; H04L 61/1511
USPC .......................................................... 726/23
See application file for complete search history.

(56) References Cited

U.S. PATENT DOCUMENTS

| | | | |
|---|---|---|---|
| 5,452,442 A | 9/1995 | Kephart | |
| 8,176,556 B1 * | 5/2012 | Farrokh et al. | 726/23 |
| 8,316,440 B1 * | 11/2012 | Hsieh et al. | 726/22 |
| 8,321,935 B1 * | 11/2012 | Chen et al. | 726/22 |
| 8,364,811 B1 * | 1/2013 | Erdmann et al. | 709/224 |
| 8,370,942 B1 * | 2/2013 | Peterson et al. | 726/24 |
| 8,667,587 B1 * | 3/2014 | Bogorad et al. | 726/22 |
| 8,813,236 B1 * | 8/2014 | Saha | H04L 63/1408 726/22 |
| 8,826,426 B1 * | 9/2014 | Dubey | H04L 63/14 726/22 |
| 2007/0006310 A1 | 1/2007 | Piccard | |
| 2007/0016951 A1 * | 1/2007 | Piccard et al. | 726/24 |
| 2008/0133540 A1 * | 6/2008 | Hubbard | H04L 63/101 |
| 2010/0031362 A1 * | 2/2010 | Himberger et al. | 726/25 |
| 2010/0057895 A1 * | 3/2010 | Huang | G06F 15/177 709/222 |
| 2010/0125663 A1 * | 5/2010 | Donovan et al. | 709/224 |
| 2010/0138375 A1 * | 6/2010 | Hanner et al. | 706/48 |

(Continued)

OTHER PUBLICATIONS

Antonkakis et al., "Building a Dynamic Reputation System for DNS", Aug. 11, 2010.

(Continued)

*Primary Examiner* — Farid Homayounmehr
*Assistant Examiner* — Christopher C Harris
(74) *Attorney, Agent, or Firm* — Van Pelt, Yi & James LLP

(57) ABSTRACT

Techniques for malware domain detection using passive Domain Name Service (DNS) are disclosed. In some embodiments, malware domain detection using passive DNS includes generating a malware association graph that associates a plurality of malware samples with malware source information, in which the malware source information includes a first domain; generating a reputation score for the first domain using the malware association graph and passive DNS information; and determining whether the first domain is a malware domain based on the reputation score for the first domain.

19 Claims, 13 Drawing Sheets

(56) References Cited

U.S. PATENT DOCUMENTS

| | | | |
|---|---|---|---|
| 2010/0235915 A1* | 9/2010 | Memon | H04L 63/145 726/23 |
| 2010/0262693 A1* | 10/2010 | Stokes et al. | 709/225 |
| 2011/0167495 A1* | 7/2011 | Antonakakis et al. | 726/24 |
| 2011/0185423 A1* | 7/2011 | Sallam | 726/23 |
| 2011/0252476 A1* | 10/2011 | Loveland et al. | 726/24 |
| 2011/0283361 A1* | 11/2011 | Perdisci et al. | 726/24 |
| 2012/0042381 A1* | 2/2012 | Antonakakis et al. | 726/22 |
| 2012/0260342 A1* | 10/2012 | Dube et al. | 726/24 |
| 2012/0311709 A1* | 12/2012 | Kang et al. | 726/24 |
| 2012/0323829 A1 | 12/2012 | Stokes et al. | |
| 2013/0036466 A1* | 2/2013 | Penta | H04L 63/102 726/22 |
| 2013/0067579 A1* | 3/2013 | Beveridge et al. | 726/24 |
| 2013/0326625 A1* | 12/2013 | Anderson et al. | 726/23 |

OTHER PUBLICATIONS

Invernizzi et al., "EvilSeed: A Guided Approach to Finding Malicious Web Pages", 2012.

Bilge et al., "Exposure: Finding Malicious Domains Using Passive DNS Analysis", NDSS 2011, 18th Annual Network and Distributed System Security Symposium, Feb. 2011,San Diego, CA.

\* cited by examiner

| group ID | First Sample Date | Last Sample Date | #hostname | #session | #sample | #filename | #uri | #device | #ip | #country | #visit |
|---|---|---|---|---|---|---|---|---|---|---|---|
| 21781 | 2012-08-03 | 2012-08-08 | 9 | 12 | 1 | 1 | 7 | 4 | 6 | 4 | 23 |

FIG. 5A

| hostname | type | #update_time |
|---|---|---|
| wittdj.nylonparadies.info | 0 | 2012-08-08 06:34:29 |
| marcodewaard.nl | 0 | 2012-08-08 01:12:01 |
| fdreeve.org | 0 | 2012-08-08 00:17:46 |
| jesuspadillajr.com | 0 | 2012-08-07 18:00:33 |
| www.jesuspadillajr.com | 0 | 2012-08-07 15:20:35 |
| phippi.jes.ee | 0 | 2012-08-07 13:50:14 |
| www.barbaratorium.dk | 0 | 2012-08-06 06:37:49 |
| www.phoneandtabletapps.com | 0 | 2012-08-06 04:48:58 |
| www.wrango.se | 0 | 2012-08-03 10:54:14 |

FIG. 5B

| group ID | First Sample Date | Last Sample Date | #hostname | #session | #sample | #filename | #uri | #device | #ip | #country | #visit host |
|---|---|---|---|---|---|---|---|---|---|---|---|
| 21825 | 2012-08-07 | 2012-08-08 | 1 | 10 | 6 | 3 | 3 | 7 | 1 | 1 | 6 |

FIG. 6A

| First Seen Last Seen | hash | filename | Domain | URI | app | signer | signature | WF | VT | MS | SVM |
|---|---|---|---|---|---|---|---|---|---|---|---|
| 2012-08-08 2012-08-08 | 68bbecb2eca706469cf6612275627f33 (Wild Fire) (MultiScanner) (virustotal) | blackad.exe | 77.81.240.156 | /trash/blackad.exe | web-browsing | | Virus/Win32.WGeneric | 1 | -1 | 0 | |
| 2012-08-08 2012-08-08 | eae2a0b54aab3058a8a8babc8abb78be (Wild Fire) (MultiScanner) (virustotal) | blackad.exe | 77.81.240.156 | /trash/blackad.exe | web-browsing | | Trojan-Downloader/Win32.agent | 1 | -1 | 1 | |
| 2012-08-08 2012-08-08 | eb08d6edfce887fa27ef968b74ccb7ef (Wild Fire) (MultiScanner) (virustotal) | output.exe | 77.81.240.156 | /trash/output.exe | web-browsing | | Trojan-Spy/Win32.zbot | 1 | -1 | 1 | |
| 2012-08-08 2012-08-08 | 0eaecedd70d67abc8a842b728834cb5 (Wild Fire) (MultiScanner) (virustotal) | icq.exe | 77.81.240.156 | /trash/icq.exe | web-browsing | | Trojan/Win32.yakes | 1 | -1 | 2 | |
| 2012-08-08 2012-08-08 | 46673a3791660a04c91ebc8091fc5174 (Wild Fire) (MultiScanner) (virustotal) | blackad.exe | 77.81.240.156 | /trash/blackad.exe | web-browsing | | Trojan-Downloader/Win32.agent | 1 | -1 | 1 | |
| 2012-08-07 2012-08-07 | e82ebb503d0d8fe219f6e313bb672d67 (Wild Fire) (MultiScanner) (virustotal) | blackad.exe | 77.81.240.156 | /trash/blackad.exe | web-browsing | | Trojan-Downloader/Win32.agent | 1 | -1 | 2 | |

FIG. 6B

MALWARE DOMAIN DETECTION USING PASSIVE DNS

BACKGROUND OF THE INVENTION

Malware is a general term commonly used to refer to malicious software (e.g., including a variety of hostile, intrusive, and/or otherwise unwanted software). For example, malware is software used or created by attackers or hackers to disrupt computer and/or computer network operation, steal proprietary information (e.g., confidential information, such as identity, financial, and/or intellectual property related information), and/or gain access to private/proprietary computer systems and/or computer networks. Malware can be in the form of code, scripts, active content, and/or other software.

Malware includes computer viruses, worms, Trojan horses, rootkits, key loggers, spyware, adware, and/or other malicious programs. Malware typically does not refer to simply defective software, which is software that has a legitimate purpose but can include harmful bugs and/or vulnerabilities that were not corrected before release of the software. However, some malware is disguised as genuine software and can come from an official company website. For example, otherwise legitimate software can be improperly packed with additional tracking software that gathers user information without user permission.

SUMMARY OF THE INVENTION

Systems and methods for malware domain detection using passive Domain Name Service (DNS) are provided. In some embodiments, a method of malware domain detection using passive Domain Name Service (DNS) includes generating a malware association graph that associates a plurality of malware samples with malware source information, the malware source information including a first domain, generating a reputation score for the first domain using the malware association graph and passive DNS information, and determining whether the first domain is a malware domain based on the reputation score for the first domain.

In one embodiment, the reputation score is based at least in part on a determination that the first domain resolves to a first Internet Protocol (IP) address associated with a first cluster in the malware association graph, and the first domain is determined to be a malware domain if the reputation score for the first domain exceeds a threshold value.

In one embodiment, the method of malware domain detection using passive DNS further includes determining that a bad Internet Protocol (IP) address resolves to one or more additional domain addresses using passive DNS information.

In one embodiment, the method of malware domain detection using passive DNS further includes determining that the first domain resolves to a first Internet Protocol (IP) address associated with a first cluster of the malware association graph.

In one embodiment, the method of malware domain detection using passive DNS further includes determining whether a DNS name server is malicious.

BRIEF DESCRIPTION OF THE DRAWINGS

Various embodiments of the invention are disclosed in the following detailed description and the accompanying drawings.

FIG. 5A is a summary report for a cluster of a malware sample associated with multiple hostnames and IP addresses generated using clustering with malware source information in accordance with some embodiments.

FIG. 5B is a hostname report for a cluster of a malware sample associated with multiple hostnames and IP addresses generated using clustering with malware source information in accordance with some embodiments.

FIG. 6A is a summary report for a cluster of a single source associated with malware sample variants generated using clustering with malware source information in accordance with some embodiments.

FIG. 6B is a hostname report for a cluster of a single source associated with malware sample variants generated using clustering with malware source information in accordance with some embodiments.

DETAILED DESCRIPTION

Figure 1:
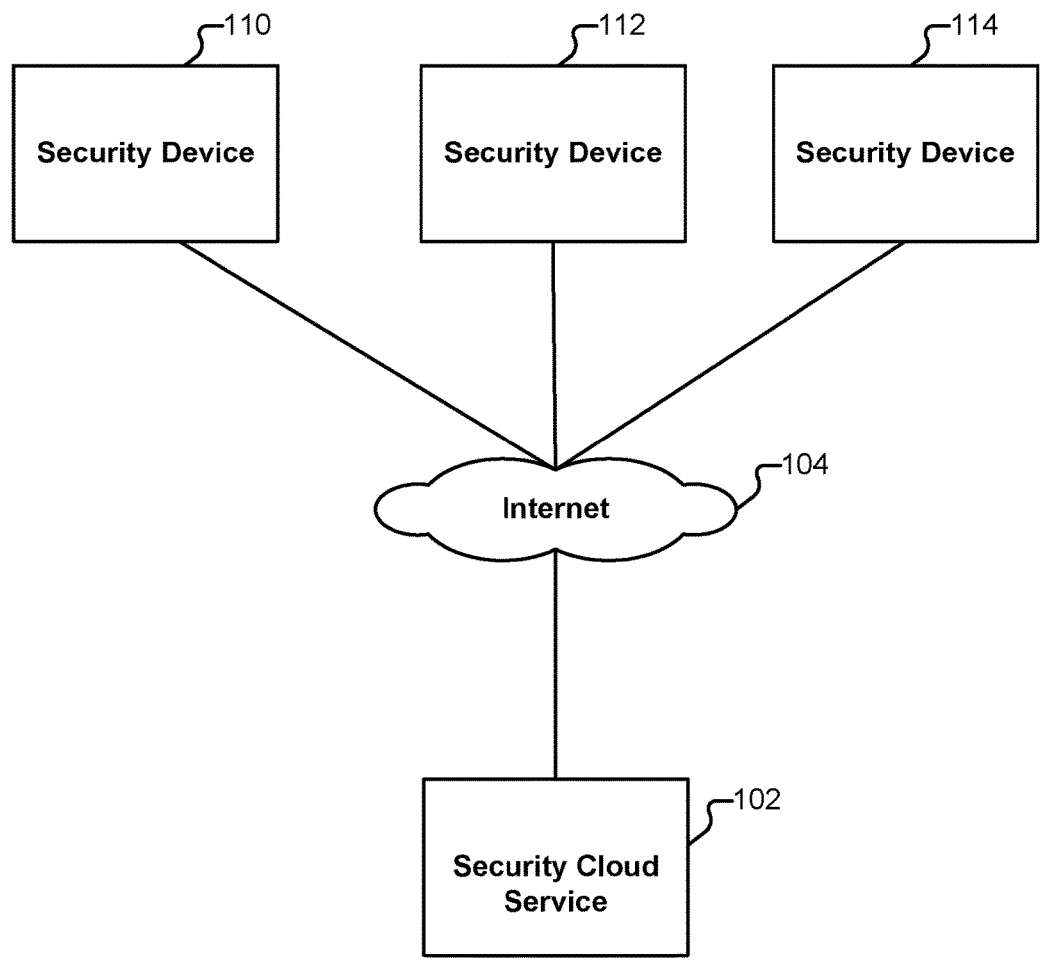
FIG. 1 is a functional block diagram illustrating malware detection using clustering with malware source information in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malware is a general term commonly used to refer to malicious software (e.g., including a variety of hostile, intrusive, and/or otherwise unwanted software). For example, malware is software used or created by attackers or hackers to disrupt computer and/or computer network operation, steal proprietary information (e.g., confidential information, such as identity, financial, and/or intellectual property related information), and/or gain access to private/proprietary computer systems and/or computer networks. Malware can be in the form of code, scripts, active content, and/or other software.

Malware includes computer viruses, worms, Trojan horses, rootkits, key loggers, spyware, adware, and/or other malicious programs. Malware typically does not refer to simply defective software, which is software that has a legitimate purpose but can include harmful bugs and/or vulnerabilities that were not corrected before release of the software. However, some malware is disguised as genuine software and can come from an official company website. For example, otherwise legitimate software can be improperly packed with additional tracking software that gathers user information without user permission.

Various types of antimalware products are commercially available that attempt to block or prevent infection of computers and/or computer networks of various types of malware. Example antimalware products include antivirus (AV) software products (e.g., host based AV software) and firewalls, such as security appliances that include firewalls (e.g., next-generation firewall solutions from Palo Alto Networks, Inc.). Such commercially available products are commonly used by personal users and/or corporate users (e.g., on their computing devices) as well as corporate networks to attempt to protect such users and/or networks from unauthorized access by other computer users and/or infection and spreading of malware on such computing devices and/or computer networks.

A variety of strategies are typically utilized by antimalware products. Signature-based detection is an antimalware technique that generally involves searching for known patterns of data within executable code (e.g., performing a static analysis of the executable file(s) to determine whether the signature can be matched based on the static analysis of the executable file(s)). Such signatures can be generated for specific malware that has been previously identified and analyzed (e.g., by a security analyst, who can determine unique features files that can be statically detected that can subsequently be used for signature-based detection of that particular malware).

It is also possible for a computer to be infected with new malware for which no signature is yet known or disseminated. To counter such so-called zero-day threats, various non-signature based techniques, such as various types of heuristic based techniques, can be used as an attempt to identify potential malware. One type of heuristic approach includes using generic signatures that can identify new viruses or variants of existing viruses by looking for known malicious code in files.

Another type of antimalware technique is sometimes referred to behavior analysis or dynamic analysis techniques. For example, dynamic analysis techniques attempt to predict what an executable file will do by running it in a sandbox (e.g., a virtual environment (VM)) and analyzing what it does within that sandbox to determine if it performs any malicious or potentially malicious actions.

However, such non-signature based approaches can fail to identify malware and/or can improperly identify legitimate software as malware (e.g., also referred to as false positives). Also, such non-signature based approaches can fail to determine if the potentially malicious software is a variant of a known malware family. For example, merely determining that a file is malware or potentially malicious using such non-signature based approaches does not identify whether that malware is a member of a particular malware family (e.g., a variant of a known malware family that is a member of such malware family).

Modern malware also often use several different types of techniques to avoid detection and hide their core functionality. For example, malware can use polymorphic packers (e.g., a polymorphic packer is a software tool that can roll up several kinds of malware into a single package, such as an e-mail attachment, and also can provide the ability to make its signature mutate over time, so it is more difficult to detect and remove using typical antimalware solutions) and/or other polymorphic or mutation related techniques (e.g., custom packers). Also, the number of different malware samples is continually increasing. Thus, providing techniques for identifying malware and/or identifying that a malware variant is part of a particular malware family presents significant challenges.

As discussed above, some antimalware approaches focus on artifacts of the actual payload of a malware sample to attempt to group malware samples together (e.g., identifying strings in the binary or structure of malicious code). However, polymorphic and custom packers hinder this effort as also discussed above. Non-signature based anti-malware techniques can sometimes detect such malware, but fail to identify whether such malware is a member of a known malware family as also discussed above.

In particular, certain malware can avoid traditional antivirus (AV) detection and firewall blocking using various approaches to evade existing anti-malware approaches. For example, malware can be distributed in diversified geo-locations, using different Internet Protocol (IP) addresses, using fast changing domain names (e.g., different web domains), varied file names, and/or different Uniform Resource Information (URI) addresses. Also, malware can be distributed using various re-packing (e.g., polymorphic packing) techniques so that such malware contain different payloads to avoid traditional AV detection approaches.

Thus, what are needed are techniques that can detect malware that use such techniques to otherwise avoid detection/blocking using existing approaches.

Accordingly, techniques for malware detection using clustering with malware source information are disclosed. For example, using various techniques for malware detection using clustering with malware source information as disclosed herein can facilitate detection of malware by identifying that such is malware by clustering with malware source information.

In some embodiments, malware detection using clustering with malware source information associates malware and malware samples based on IP, hostname/domain (e.g., web domain), URI, border gateway protocol (BGP) information, and/or various other source and related information to determine associations between malware, malware families, and various sources of such malware and malware samples, and are not limited to just a specific IP relationship between sources of malware samples.

In some embodiments, malware detection using clustering with malware source information includes generating a first cluster of source information associated with a first malware sample, in which the first malware sample was determined to be malware, and the first malware sample was determined to be downloaded from a first source; and determining that a second source is associated with malware based on the first cluster. In some embodiments, the first cluster associates related Internet Protocol (IP) address information and related domain information with the first malware sample. In some embodiments, the first cluster is generated using a searchable graph (e.g., directed graph) that associates related Internet Protocol (IP) address information and related domain information with the first malware sample.

In some embodiments, malware detection using clustering with malware source information further includes generating a graph associating a plurality of source information with the first malware sample to generate the first cluster.

In some embodiments, malware detection using clustering with malware source information further includes generating a graph associating Internet Protocol (IP) address related source information and domain (e.g., web domain) related source information with the first malware sample to generate the first cluster.

In some embodiments, malware detection using clustering with malware source information further includes generating a directed graph associating a plurality of source information with the first malware sample to generate the first cluster (e.g., indicating malware sample(s) "comes from" with direction and/or without direction, including IP resolution information to associated IP addresses with domains).

In some embodiments, malware detection using clustering with malware source information further includes determining a second malware sample is malware based on an association with the first cluster.

In some embodiments, malware detection using clustering with malware source information further includes determining a second malware sample is associated with the first cluster, in which the second malware sample is determined to come from a third source that is associated with the first cluster; and determining the second malware sample is malware based on the determination that the second malware sample comes from the third source that is associated with the first cluster.

In some embodiments, malware detection using clustering with malware source information further includes determining a domain (e.g., web domain) is associated with a malware family based on an association with the first cluster. In some embodiments, malware detection using clustering with malware source information further includes determining an Internet Protocol (IP) address is associated with a malware family based on an association with the first cluster.

In some embodiments, malware detection using clustering with malware source information further includes identifying new malware samples and, more specifically, identifying that such malware is part of a particular malware family. In particular, identifying that such malware is part of a particular malware family provides additional information to an information technology (IT), network, and/or security admin (istrator) and a security vendor (e.g., knowing a modus operandi of attackers can assist in defensive responses to an attack). For example, certain malware families can present more significant risks or threats to users and/or enterprises, such as Zeus (e.g., also known as Zbot, is a malware toolkit that allows a cybercriminal to build their own Trojan Horse, and, in particular, Zeus is a Trojan horse that can be used to steal banking information by man-in-the-browser keystroke logging and form grabbing, and was first identified in July 2007 when it was used to steal information from the United States Department of Transportation, and it became more widespread in March 2009). Thus, a security solution that can inform IT of an enterprise that one or more of their devices was infected with malware and/or attempted to download malware (e.g., Zeus is commonly delivered using drive-by-download techniques) that is a member of the Zeus malware family can provide IT with valuable information on how to respond based on the known threats and/or risks associated with the Zeus malware family (e.g., or other malware families that can pose similar or different risks or threats).

In some embodiments, malware detection using clustering with malware source information further includes detecting zero-day malware samples. For example, zero-day malware samples can include new malware and/or new variants of a known malware family for which signatures and/or rules were not previously generated for detecting such zero-day malware samples. Thus, new signatures and/or rules can then be generated for such detected zero-day malware samples using various techniques described herein. As an example, a security cloud service can then distribute new rule(s) and/or signature(s) to security software and/or security devices for detecting such new zero-day malware samples, and/or generate alerts/notifications.

However, identifying malware domains can present challenges to properly determine whether a domain should be identified as a malware domain. Also, malicious name servers can also present challenges to properly identifying malicious domains that are resolved to malware IP addresses.

In particular, Domain Name Service (DNS), as a distributed naming database, generally provides a mapping of IP addresses with domain names. Attackers in various malicious activities can exploit the DNS scheme. Existing approaches attempt to use such DNS information to detect malicious domains by extracting specific features of DNS and applying machine-learning techniques (e.g., heuristic and/or other machine learning techniques) based on the extracted features. However, such existing approaches to analyze DNS information are prone to false positives and/or fail to identify certain malware domains.

What are needed are new and improved techniques that can leverage the information in DNS to identify malicious entities, such as malware domains.

In some embodiments, techniques for malware detection using clustering with malware source information can also be applied to detect malware domains using the malware association graph (e.g., to facilitate identifying IP addresses that have been frequently involved in malicious activities) as described herein. In some embodiments, domains are further evaluated using various passive DNS techniques as described herein.

In some embodiments, passive DNS (pDNS) information is collected, in which DNS responses are collected passively (e.g., by listening to DNS traffic) from distributed sources (e.g., using passive DNS sensors). For example, the passive DNS information can be analyzed and correlated with other information, such as a malware association graph, to identify malicious entities, such as malware domains.

In some embodiments, domains reputations are determined using passive DNS techniques as described herein. In some embodiments, domain reputations are evaluated by discovering relationships or associations with other domains. In some embodiments, these relationships or associations include common host IP, common name server, and/or common originating session. For example, a domain reputation score can be generated using various techniques described herein (e.g., based on passive DNS information and using a malware association graph that associates malware samples with malware source information including domains), and if a DNS reputation score exceeds a threshold, then the domain can be identified as a malware domain (e.g., and malware samples from that domain can be identified as malware). Also, un-sanitized relations can introduce false positives in detection, so a filter can be applied to filter out relations between benign domains. Based on the sanitized relations, a reputation propagation mechanism can be applied evaluate the reputation of unknown domains from known domains. This approach can re-evaluate the reputation of domains given new data to maintain and improve malware domain detection accuracy.

Accordingly, techniques for malware domain detection using passive Domain Name Service (DNS) are disclosed. In some embodiments, malware domain detection using passive DNS includes generating a malware association graph that associates a plurality of malware samples with malware source information, in which the malware source information includes a first domain; generating a reputation score for the first domain using the malware association graph and passive DNS information; and determining whether the first domain is a malware domain based on the reputation score for the first domain. In some embodiments, the reputation score is based at least in part on a determination that the first domain resolves to a first Internet Protocol (IP) address associated with a first cluster of the malware association graph, and the first domain is determined to be a malware domain if the reputation score for the first domain exceeds a threshold value. In some embodiments, a first cluster of the malware association graph associates related IP address information and related domain information with a first malware sample. In some embodiments, the malware association graph includes a searchable directed graph that associates related IP address information and related domain information with a first malware sample.

In some embodiments, malware domain detection using passive DNS further includes determining that a bad IP address (e.g., an IP address determined to be associated with malware) resolves to one or more additional domain addresses using passive DNS information.

In some embodiments, malware domain detection using passive DNS further includes determining that the first domain resolves to a first IP address (e.g., using passive DNS information) associated with a first cluster of the malware association graph.

In some embodiments, malware domain detection using passive DNS further includes determining the first domain is associated with malware based on a first cluster of the malware association graph.

In some embodiments, malware domain detection using passive DNS further includes generating a first cluster of the malware association graph associating a plurality of source information with a first malware sample, in which the plurality of source information includes the first domain.

In some embodiments, malware domain detection using passive DNS further includes generating a first cluster of the malware association graph associating IP address related source information and domain related source information with a first malware sample, in which the plurality of source information includes the first domain.

In some embodiments, malware domain detection using passive DNS further includes determining whether a DNS name server is malicious (e.g., based on a reputation score generated using passive DNS information).

In some embodiments, malware domain detection using passive DNS further includes providing a DNS relation based approach to evaluate and/or update the reputation of domains, as further described herein with respect to various embodiments. For example, this approach can be used to detect malware domains. As another example, this approach can be used to track a history of malware domains to provide a more comprehensive, up-to-date, and/or accurate information of the involvement of domains in malicious activities.

In some embodiments, malware domain detection using passive DNS further includes providing multiple categories of features extracted from DNS data and public information, and using these features in classification models to evaluate the reputation of IP addresses, as further described herein with respect to various embodiments. For example, this approach can improve the accuracy of the relation graph (e.g., malware association graph that includes relations among domains) among domains. As another example, this approach can be used to detect malicious activities associated with an IP address.

In some embodiments, malware domain detection using passive DNS further includes providing a framework that monitors different entities in DNS and evaluates the reputations of such entities. For example, the framework can improve the detection accuracy of malicious domains, and the framework can also monitor the malicious activities based on passive DNS information (e.g., passive DNS data), as further described herein with respect to various embodiments.

FIG. 1 is a functional block diagram illustrating malware detection using clustering with malware source information in accordance with some embodiments. As shown, a security cloud service 102 is in network communication via the Internet 104 with various security devices 110, 112, and 114 (e.g., host-based or gateway/appliance/server based firewalls and/or security appliances that include firewall functionality, which can be located on the premises of one or more customers of the security cloud service). In some embodiments, the security cloud service 102 receives malware samples (e.g., potential malware) from various security devices 110, 112, and/or 114 via the Internet 104 and performs malware detection using clustering with malware source information. For example, the security cloud service can attempt to determine one or more relationships and, in particular, correlations between the received malware samples with malware source information using various techniques described herein.

For example, the security cloud service can provide for integration of such inline firewalls with the cloud by making use of a customer's on-premises firewalls in conjunction with a cloud-based security analysis engine that can deliver both protection and performance. The inline firewall on one or more customer premises can capture unknown files and can perform inline enforcement (e.g., using signature detection and/or other techniques locally on the security device) while maintaining high network throughput and low latency. The analysis of unknown files, sometimes referred to herein as malware samples, can then be offloaded to the security cloud service that provides a secure cloud-based engine to identify unknown malware and subsequently deliver protections to all locations of the security cloud service. The customer's on-premises firewalls can be configured to securely communicate with the security cloud service (e.g., using secure communication protocols, such as SSL, VPNs, and/or using other secure communication techniques). An example security cloud service includes the Wildfire® security cloud service provided by Palo Alto Networks.

For example, when an inline firewall encounters an unknown file, the file can be submitted to the security cloud service along with various associated/source information, such as download hostname, download URI/URL, download application, download IP/port, victim's IP/port, firewall IP, geo-location information, and/or various other malware source information. Such submissions of the potential malware samples can be provided manually or automatically based on a security policy configured for each security device and/or customer. In particular, the security cloud service can utilize the received malware sample(s) and associated/source information to perform malware detection using clustering with malware source information as further described herein.

In some embodiments, malware detection using clustering with malware source information includes using a security cloud service that collects and/or receives malware samples (e.g., globally from various customers using AV, firewall, and/or other security software and/or security devices (e.g., an integrated security appliance that includes firewall functionality and/or IPS/IDS functionality, and/or a security gateway that includes firewall functionality and/or IPS/IDS functionality). An example security cloud service includes the Wildfire® security cloud service provided by Palo Alto Networks. For example, such malware samples can include various information associated with each of the malware samples, such as a download hostname, download URI/URL, download application, download IP/port, victim's IP/port, firewall IP, and/or geo-location information. The security cloud service can use such information to generate a graph to then generate clusters to determine relationships (e.g., correlations) based on such information as further described herein with respect to various embodiments. In some embodiments, the security cloud service implements clustering algorithms using a clustering engine to identify such correlations as further described herein. In some embodiments, the security cloud service updates the clustering periodically (e.g., hourly, daily, and/or based on another time or event based trigger) with new sample/domain feed (e.g., uploaded or retrieved malware sample and associated information from various customers and/or security devices).

In particular, using such techniques can reveal interesting correlations among malware samples, download domains/IPs, and visiting domains/IPs. For example, using such techniques can reveal that the same malware samples (e.g., malware samples that have the same hash value, using an MD5 hash or another hashing algorithm) can come from different hostnames/IPs and/or geo-locations, and the same malware samples can also have different download URIs and filenames. As another example, different malware samples can come from the same hostname/IP and have similar malicious behaviors. As yet another example, different malware samples can visit the same hostname/IPs (e.g., visiting hostname/IP, referring to those hostname/IPs that the malware sample attempts to communicate with, such as to send information thereto and/or receive information therefrom). Thus, as disclosed herein, malware detection using clustering with malware source information provides for malware sample clustering that can associate various information associated with malware samples (e.g., domain, IP, hostname, geo-location, source—comes from information, destination—communicates/connects to information, and/or various other associations, relationships, or other information) to reveal correlations that can be used to identify new sources of malware (e.g., to identify new domains/IPs that are associated with delivering malware), verify that particular malware samples are malware (e.g., to detect new malware), and/or determine malware samples to be associated with certain malware families (e.g., to detect new variants of particular malware families). Thus, as disclosed herein, a clustering framework can be used to detect malware even when the malware samples are distributed (e.g., from different domains, IPs, and/or geo-locations), polymorphic, zero-day threats (e.g., new malware that was previously undetected), and/or using various detection avoidance techniques that would otherwise evade traditional AV detection and/or firewall blocking approaches.

In some embodiments, malware detection using clustering with malware source information includes clustering malware samples based on one or more of the following relationships or associations: (1) malware sample—source domain/IP; (2) malware sample—visiting domain/IP; and (3) source domain—hosting malware samples. In some embodiments, malware detection using clustering with malware source information includes generating a cluster of malware samples that identifies new malicious hostnames/IPs from known malware samples related information. In some embodiments, malware detection using clustering with malware source information includes generating a cluster of malware samples that identifies new malware samples from previous domain/malware sample interaction(s), without requiring use of AV engine detection or behavior analysis techniques. For example, these techniques can be used to detect and block zero-day malware samples, and the security cloud service can then distribute new rule(s) and/or signature(s) to security software and/or security devices for detecting such new zero-day malware samples.

Figure 2:
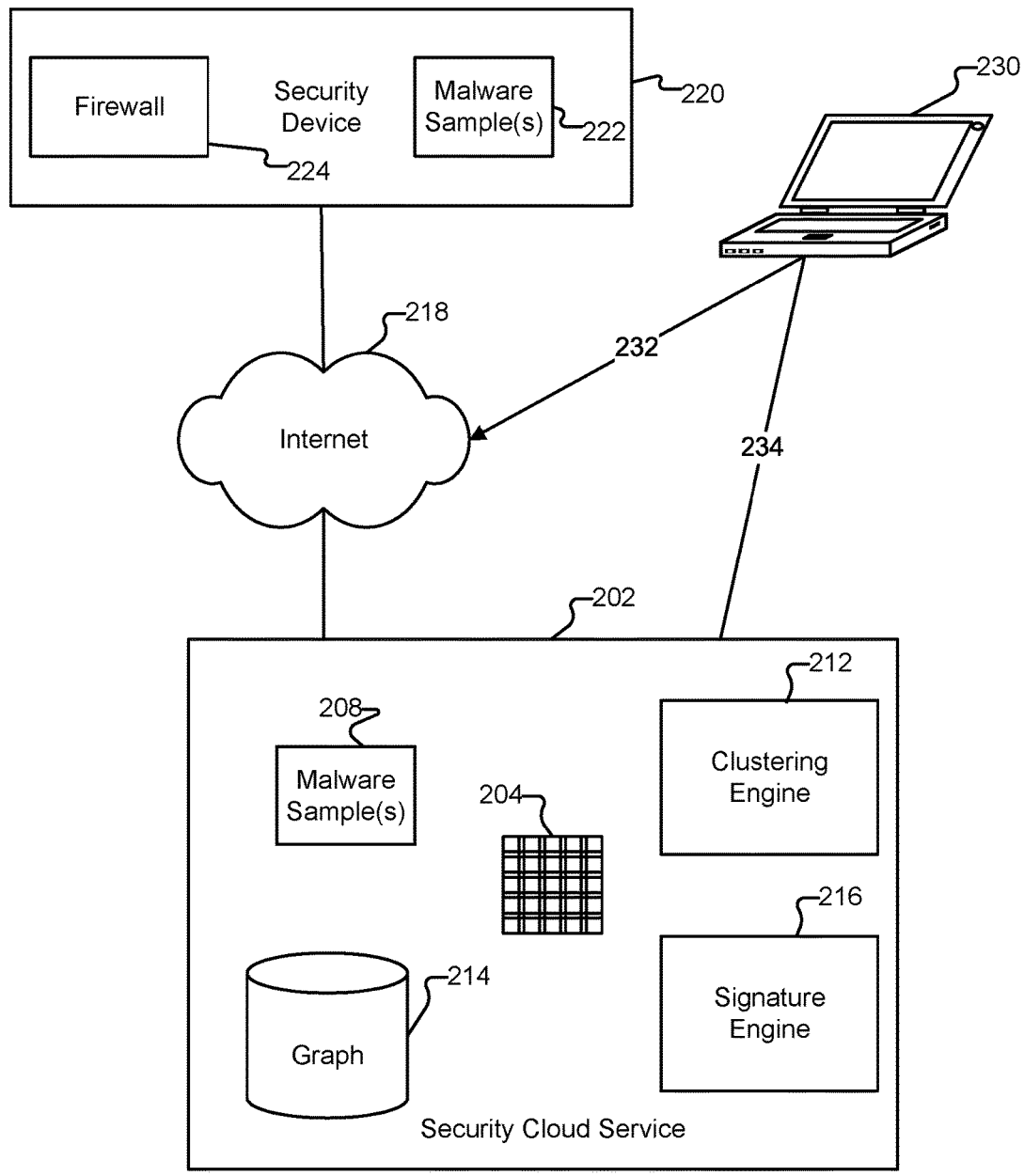
FIG. 2 is another functional block diagram illustrating malware detection using clustering with malware source information in accordance with some embodiments.

FIG. 2 is another functional block diagram illustrating malware detection using clustering with malware source information in accordance with some embodiments. As shown, a security cloud service 202 is in communication with one or more security devices, including security device 220, via the Internet 218. The security device 220 includes a firewall 224 (e.g., an inline firewall) and potential malware samples 222. For example, the potential malware samples 222 can include potential malware samples that the security device 220 could not determine whether such are malware and/or the malware family associated with such samples. As similarly discussed above, such potential malware samples 222 can be sent to the security cloud service 202 for further analysis. In some embodiments, the security cloud service can also include known malware samples and associated source information to populate or seed a graph and periodically update a graph to facilitate correlations between malware samples/variants and source information as further described herein. As also shown, the security cloud service includes a processor(s) 204, malware samples 208 received from various security devices including security device 220, a clustering engine 212, graph 214 (e.g., for graphing malware samples with malware source information using various techniques described herein), and a signature engine 216 (e.g., for automatically generating new signatures/rules for newly detected malware, such as zero-day malware threats). As further described herein with respect to various embodiments, the security cloud service 202 performs malware detection using clustering with malware source information. For example, the security cloud service can attempt to determine one or more relationships between the received malware samples with malware source information using various techniques described herein.

As also shown, an IT/security admin can use a computing device 230 (e.g., desktop computer, workstation, laptop, tablet, smart phone, and/or other computing device) to communicate with the security cloud service 202 via a communication 232 through the Internet 218 or through a local communication 234. For example, an IT/security admin can use a computing device 230 to send a potential malware sample for further analysis to the security cloud service 202. As another example, an IT/security admin can use computing device 230 to access the graph data 214 stored (e.g., in a data store, such as a database) on the security cloud service 202.

Figure 3:
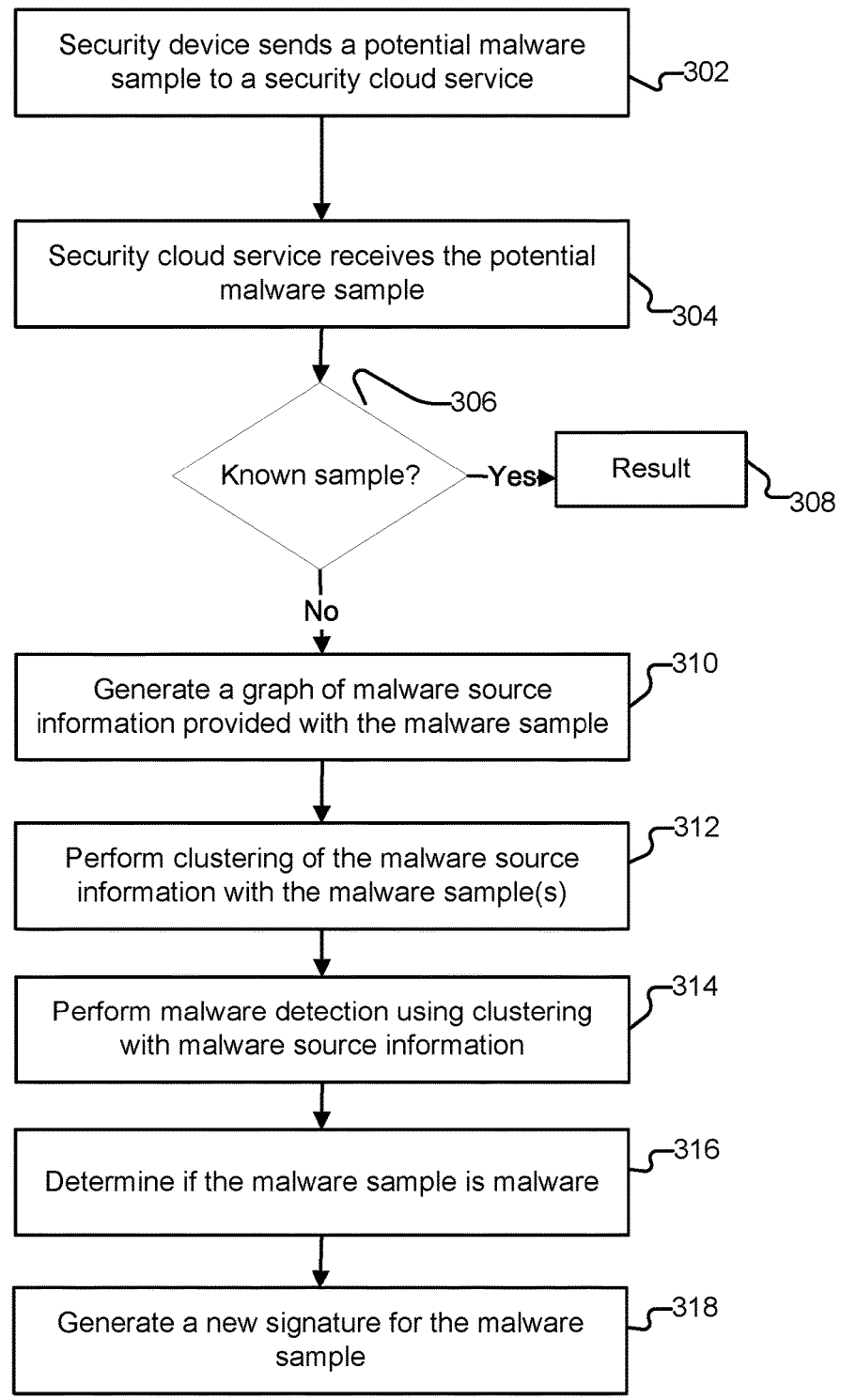
FIG. 3 is a flow diagram illustrating malware detection using clustering with malware source information in accordance with some embodiments.

FIG. 3 is a flow diagram illustrating malware detection using clustering with malware source information in accordance with some embodiments. At 302, a security device sends a potential malware sample to a security cloud service. At 304, the security cloud service receives the potential malware sample. Whether the potential malware sample is a known sample (e.g., has been previously analyzed and results of that prior analysis have been cached or stored by the security cloud service) is determined at 306. For example, files can be matched by various comparison techniques (e.g., using hashes, such as an MD5 based hash or other hashing or file comparison techniques). If the potential malware sample was already/previously analyzed by the security cloud service, then the previously determined result is provided at 308. Otherwise, processing proceeds to 310 to generate a graph of malware source information provided with the malware sample. At 312, clustering of the malware source information with the malware sample(s) is performed using a clustering engine. At 314, malware detection using clustering with malware source information is performed. At 316, whether the malware sample is malware is determined (e.g., using clustering with malware source information in accordance with various techniques described herein). In some embodiments, new sources (e.g., hostnames, IPs, and/or domains) of malware can also be determined using clustering with malware source information in accordance with various techniques described herein. In some embodiments, new visiting entities (e.g., hostnames, IPs, and/or domains) of malware can also be determined using clustering with malware source information in accordance with various techniques described herein. At 318, a new signature and/or rule is automatically generated if the malware sample was determined to be new malware (e.g., zero-day threat or previously undetected malware for which a signature/rule does not already exist for detecting that particular malware, which can be a new type of malware or a new variant of a known malware family). In some embodiments, the results for the potential malware sample are cached or stored by the security cloud service (e.g., to avoid having to repeat the analysis of a later submission of an identical malware sample from another security device and to maintain a collection of known, previously analyzed malware samples).

Figure 4:
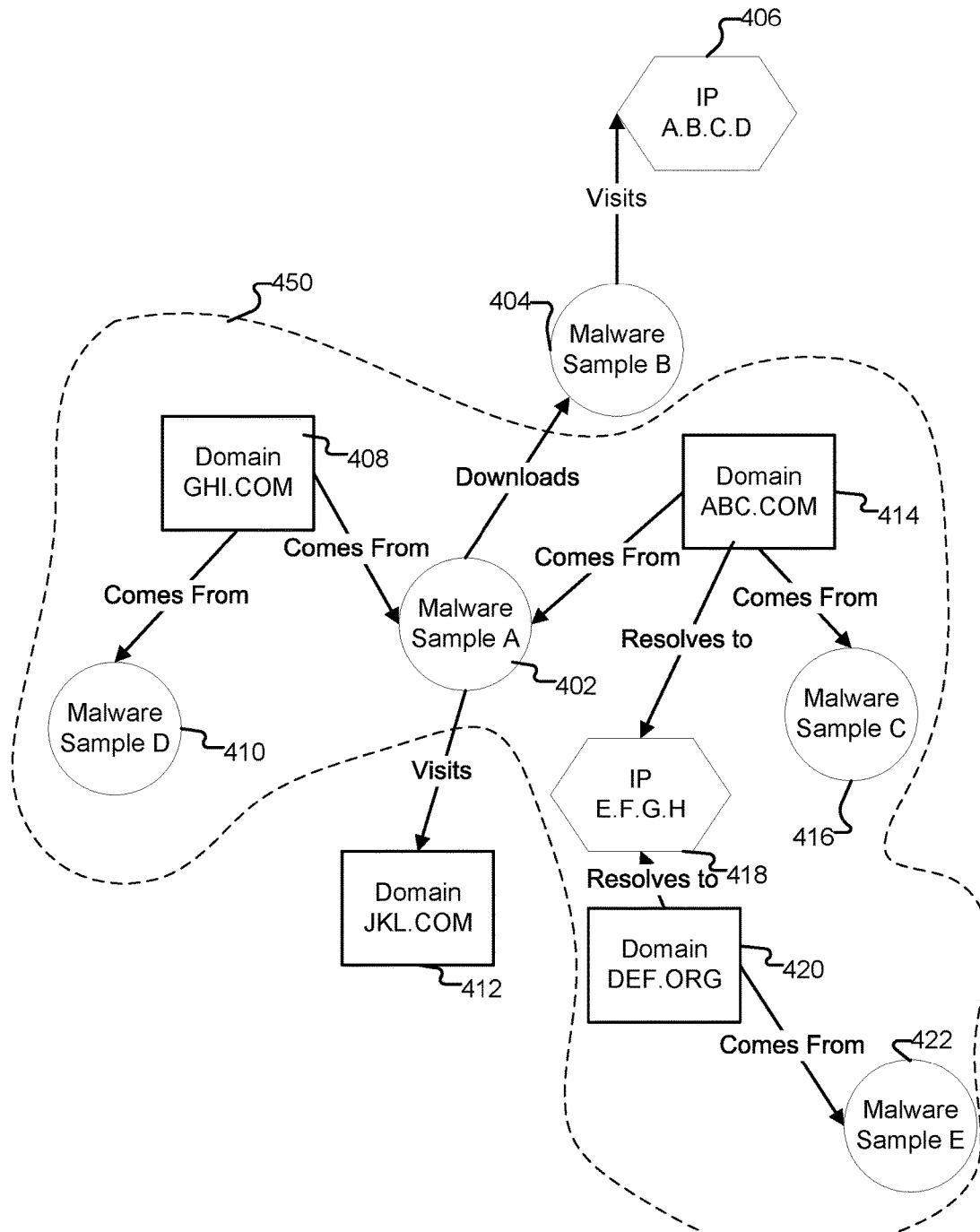
FIG. 4 is a directed graph diagram illustrating malware detection using clustering with malware source information in accordance with some embodiments.

FIG. 4 is a directed graph diagram illustrating malware detection using clustering with malware source information in accordance with some embodiments. In some embodiments, malware detection using clustering with malware source information includes identifying malware, IP addresses associated with malware (e.g., malware IP), domains (e.g., web domains) associated with malware (e.g. malware domains), new malware variants associated with a known malware family, and/or botnets using a graph (e.g., a directed graph) to generate malware clusters as described herein with respect to various embodiments. For example, malware, malware IPs, and malware domains that come from the same botnet or same entities can be determined to be related. In particular, these relationships can be used to identify new malware, malware domains and malware IPs. As an example, a domain can be determined to be a malware domain if it serves malware, a malware sample (e.g., an executable file) can be determined to be malware if it comes from a malware domain, an IP address can be determined to be a malware IP if a malware domain resolves to that IP address, and so forth based on such relationships that can be determined based on clustering generated using a graph (e.g., a directed graph) as described herein with respect to various embodiments. Using such techniques, more malware samples, malware IPs, and malware domains can be identified through such graph and clustering techniques.

In some embodiments, malware detection using clustering with malware source information includes generating a directed graph to identify malware clusters as described herein with respect to various embodiments. In some embodiments, malware samples, domains, and IP addresses (IPs) are represented as nodes in the directed graph, and edges represent relationships or associations between the nodes. Through graph traverse techniques, new malware, malware domains, malware IPs, and malware family relationships can be determined as further described herein with respect to various embodiments. For example, open source graph traversal libraries from Apple and/or other graph traversal packages can be used to implement the graph traversal techniques described herein. Also, malware samples, malware domains, and malware IPs can similarly be clustered for the same botnet (e.g., or gang) using the various techniques described herein with respect to various embodiments.

Referring to FIG. 4, a directed graph is generated based on various malware samples and associated malware source information. As shown, a malware sample A 402 downloads malware sample B 404. Malware sample B 404 visits IP address A.B.C.D 406. Malware sample A 402 comes from domain GHI.COM 408. Malware sample D 410 comes from domain GHI.COM 408. Malware sample A 402 visits domain JKL.COM 412. Malware sample A 402 also comes from domain ABC.COM 414. Malware sample C 416 comes from domain ABC.COM 414. Domain ABC.COM 414 resolves to IP E.F.G.H 418. Domain DEF.ORG 420 also resolves to IP E.F.G.H 418. Malware sample E 422 comes from domain DEF.ORG 420. As shown, a cluster 450 includes malware samples, malware domains, and malware IPs that are determined to be associated using various techniques described herein. In this example, domain GHI.COM 408 can be assumed to be a known malware domain such that using this information regarding malware domain GHI.COM 408, cluster 450 can be generated to identify new malware, new malware domains, and new malware IPs based on comes from, and resolves to relationships as shown in which correlations between malware samples with domains and IPs can be determined.

As similarly discussed above, certain malware samples, which have the same hash value, can come from different hostnames, different IPs, and different geo-locations. Also, certain malware samples can have different download URIs and/or filenames. In some cases, different malware samples can come from the same domain (e.g., hostname/web domain), same IP, and such malware samples can have similar malicious behaviors (e.g., detected using behavioral analysis or similar techniques). Based on various associations or relationships, a malware sample/domain/IP clustering framework is implemented to perform malware detection using clustering with malware source information. In some embodiments, the framework clusters or groups domains, IPs, and samples; discovers the correlations among malware domains and IPs; determines new malware domains and IPs from previous sample information; determines new malware samples from previous domain/sample interaction(s), and such can be provided without requiring AV engine detection or behavior analysis; and help to identify new malware samples.

FIG. 5A is a summary report for a cluster of a malware sample associated with multiple hostnames and IP addresses generated using clustering with malware source information in accordance with some embodiments. As shown, the summary report is for a cluster for the same malware sample (e.g., a sample with a particular MD5 hash, such as 0ebc4bf0a5e172aa293214deb49d7cb0) that is associated with diversified/different domains and IPs. In particular, this malware sample was determined to be associated with 9 different hostnames (e.g., domains or web domains), 7 different URIs, 6 different IP addresses and 4 different countries.

FIG. 5B is a hostname report for a cluster of a malware sample associated with multiple hostnames and IP addresses generated using clustering with malware source information in accordance with some embodiments. As shown in the hostname report, the malware sample was first received on Aug. 3, 2012 from www.wrango.so and was subsequently received from various different hostnames. For example, assuming that the malware sample is determined or known to be malware, then domains that were previously not known to be associated with malware (e.g., malware domains) can be determined when such a new domain is associated with downloading this malware sample (e.g., a new domain wittdj.nylonparadies.info that provides the malware sample can be determined to be a malware domain even if it is the first time that this domain has been observed by the cloud security service).

FIG. 6A is a summary report for a cluster of a single source associated with malware sample variants generated using clustering with malware source information in accordance with some embodiments. FIG. 6B is a malware sample variants report for a cluster of a single source associated with malware sample variants generated using clustering with malware source information in accordance with some embodiments. As shown in FIG. 6B, the summary report is for a cluster of a single source (e.g., host 77.81.240.156) that is provides six malware sample variants (e.g., with different hash values, filenames, URIs, etc.). In particular, when an AV engine and/or behavior blocking engine scans such malware sample variants, the result can be different virus names are detected/identified and/or such may not even be able to detect that such is malware (e.g., 68bbecb2eca706469cf6612275627f33 may not be detectable using such existing AV and/or behavior blocking techniques as it is a new variant that was not previously detected and/or exhibits new behaviors that evade detection). However, from the sample/domain correlation, the new malware sample variant can be determined to be malware and these six malware variants can be determined to belong to the same malware family (e.g., a variant of the Zbot family, or, in some cases, another malware family) using the various techniques described herein with respect to various embodiments.

In some embodiments, malware detection using clustering with malware source information includes performing a clustering algorithm (e.g., using a clustering engine) to discover sample/domain correlations. In some embodiments, the clustering algorithm includes a recursive algorithm to find all the samples and domains from a database (e.g., graph data stored in a database) that are correlated. An example pseudo code algorithm is reproduced below.

```
For hostname in host_pool:
    call cluster(hostname, cluster_id)
    cluster_id++
Function cluster(host_A, cluster_id)
{
    Add host_A to cluster[cluster_id]
    Remove host_A from host_pool
    Sample_List = Find all samples from host_A in Database
    For Sample_S in Sample_List:
        Add Sample_S to cluster[cluster_id]
        Host_List = Find all hostnames provide Sample_S in Database
        For Host_B in Host_List:
            Call cluster(Host_B, cluster_id)
}
```

Figure 7:
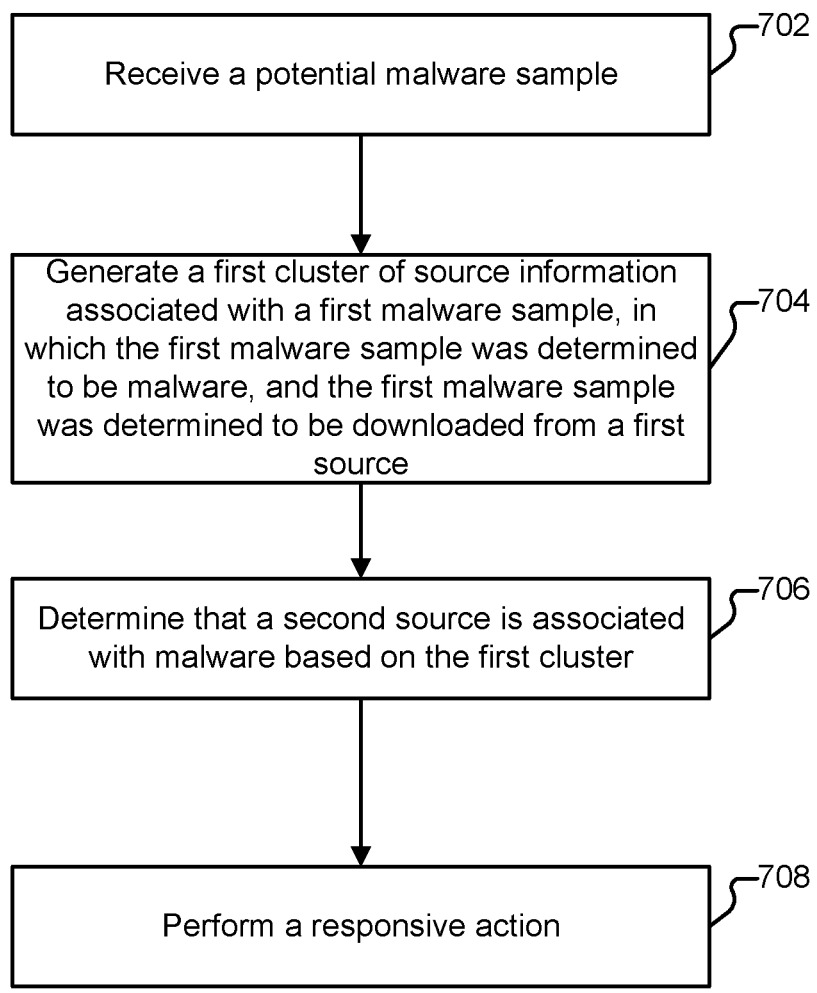
FIG. 7 is another flow diagram illustrating malware detection using clustering with malware source information in accordance with some embodiments.

FIG. 7 is another flow diagram illustrating malware detection using clustering with malware source information in accordance with some embodiments. At 702, a potential malware sample is received (e.g., at a security cloud service). At 704, generating a first cluster of source information associated with a first malware sample is performed (e.g., generating a cluster in a graph, such as a directed graph, using various techniques described herein), in which the first malware sample was determined to be malware, and the first malware sample was determined to be downloaded from a first source. At 706, determining that a second source is associated with malware based on the first cluster is performed. At 708, a responsive action is performed (e.g., a new signature can be generated for new malware, and/or an alert and/or notification to a security vendor, IT/security admin, user, and/or other person or entity associated with the submitted potential malware sample can be generated if new malware was detected, a new malware source was identified, and/or a new malware visited entity was identified, and/or other relationships or new malware related information was identified).

Figure 8:
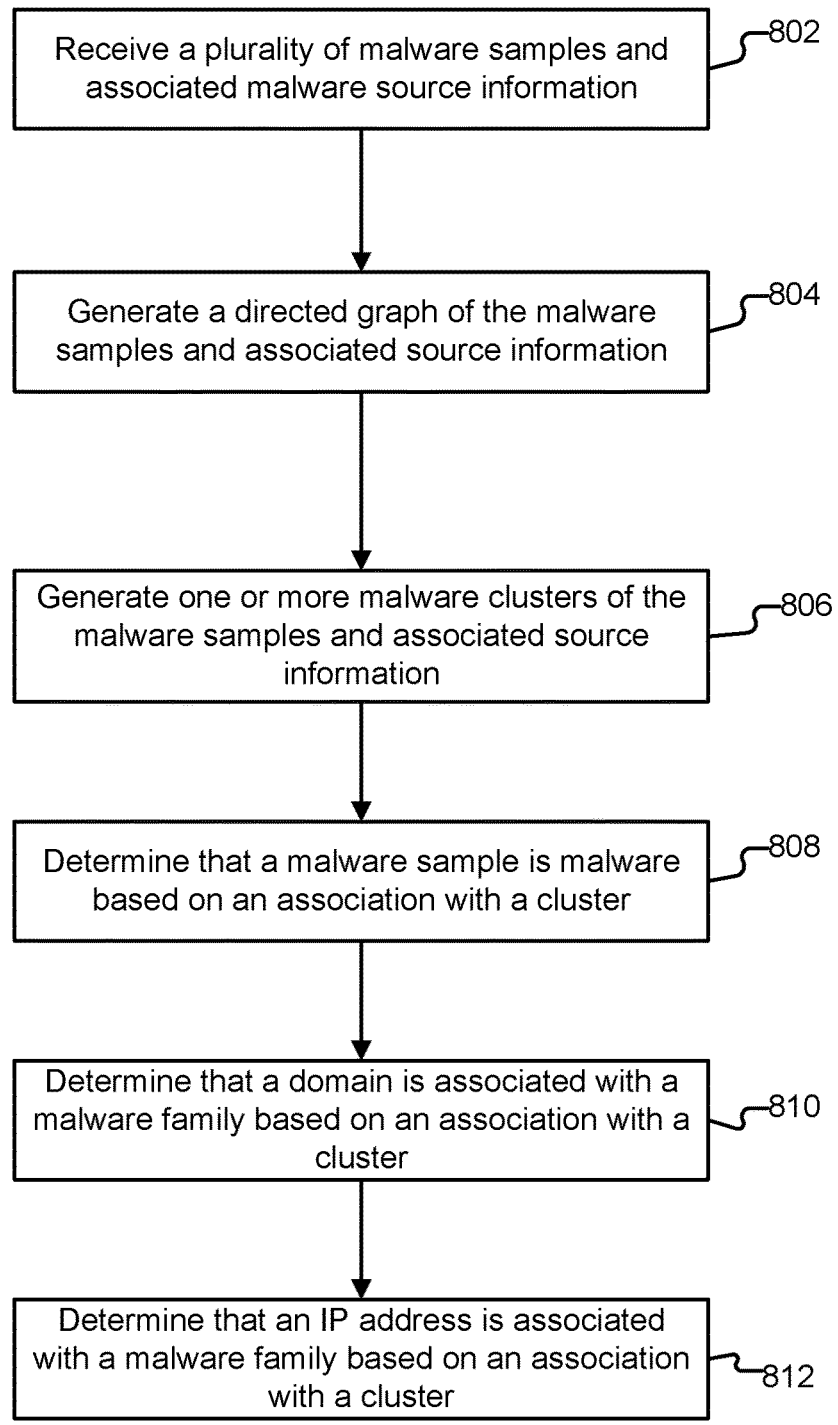
FIG. 8 is another flow diagram illustrating malware detection using clustering with malware source information in accordance with some embodiments.

FIG. 8 is another flow diagram illustrating malware detection using clustering with malware source information in accordance with some embodiments. At 802, a plurality of malware samples and associated malware source information are received (e.g., at a security cloud service). At 804, generating a directed graph of the malware samples and associated source information is performed using various techniques described herein. At 806, generating one or more malware clusters of the malware samples and associated source information is performed using various techniques described herein. At 808, determining that a malware sample is malware based on an association with a cluster is performed. At 810, determining that a domain (e.g., a web domain) is associated with malware based on an association with a cluster is performed. At 812, determining that an IP address is associated with malware based on an association with a cluster is performed.

In some embodiments, malware domain detection using passive Domain Name Service (DNS) techniques are provided as further described herein. In some embodiments, passive DNS information can be collected, correlated, and analyzed to detect malware domains. In some embodiments, passive DNS information can be collected, correlated, and analyzed to determine relationships and associations among various entities in DNS (e.g., IP addresses, domains, BGP prefixes, ASs, DNS name servers, and/or other entities) so that malicious activities (e.g., including potentially malicious activities) can be detected by analyzing passive DNS data, as further described below with respect to FIG. 9.

Figure 9:
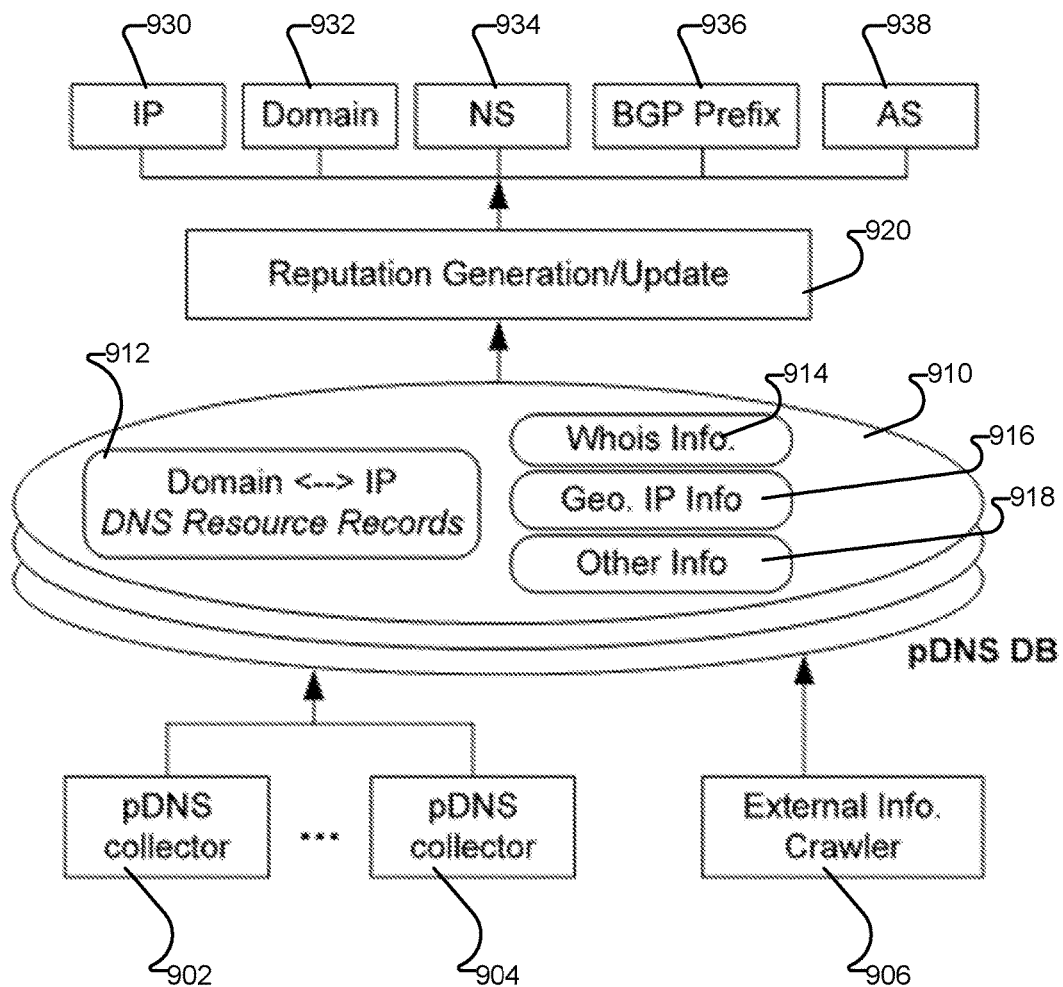
FIG. 9 is a functional block diagram illustrating malware domain detection using passive Domain Name Service (DNS) in accordance with some embodiments.

FIG. 9 is a functional block diagram illustrating malware domain detection using passive Domain Name Service (DNS) in accordance with some embodiments. As shown, a passive DNS (pDNS) database 910 is provided. The pDNS database 910 stores various passive DNS and public DNS information received from various sources, including passive DNS (pDNS) collectors 902 and 904 and external information crawler 906. In particular, the pDNS database 910 includes DNS resource records that include domain to IP mapping information 912, Whois information 914, geographical IP information 916 (e.g., geo-based locations of IP addresses), and various other passive DNS and public DNS information 918 (e.g., DNS name servers and/or other DNS related information). As shown, this passive DNS information (e.g., passive DNS data stored in the pDNS database 910) can be used to generate and/or update domain reputations using reputation engine 920, which can generate/update reputations for IP addresses 930, domains 932, DNS Name Servers (NS) 934, Border Gateway Protocol (BGP) prefixes 936, and autonomous systems (AS) 938, as further described herein with respect to various embodiments.

In some embodiments, the pDNS collectors 902 and 904 collect and send DNS responses to pDNS DB 910, which stores the DNS resource records (RRs) (e.g., in the format of a tuple (of RR name, RR type, IP, Name Server (NS), Time To Live (TTL)) and the source of the records) in the responses. In some embodiments, the external information crawler 906 retrieves information (e.g., periodically) from external sources. For example, this information can include WHOIS information about the domains, BGP prefixes, AS, and geo-location information about the IPs, and/or various other information as shown. Using the information in the pDNS DB 910, various techniques for generating reputation scores for each entity (e.g., IP 930, domain 932, NS 934, BGP prefix 936, and AS 938) can be provided as further described herein with respect to various embodiments. For example, the generated reputation scores can also be updated (e.g., periodically and/or based on event trigger(s)) to reflect the information update on such entities. In some embodiments, a domain is identified as a malware domain using a reputation threshold for the domain (e.g., a domain is deemed a malware domain if a calculated reputation score for the domain exceeds a threshold value).

In some embodiments, malware domain detection using passive DNS further includes providing a DNS relation based approach to evaluate and/or update the reputation of domains. For example, this approach can be used to detect malware domains. As another example, this approach can be used to track a history of malware domains to provide a more comprehensive, up-to-date, and/or accurate information of the involvement of domains in malicious activities. In some embodiments, malware domain detection using passive DNS further includes providing, for example, multiple categories of features extracted from DNS data and public information, and using these features in classification models to evaluate the reputation of IP addresses, as further described herein with respect to various embodiments. For example, this approach can improve the accuracy of the relation graph among domains. This approach can also be used to detect malicious activities associated with an IP address.

In some embodiments, malware domain detection using passive DNS further includes a framework as shown in FIG. 9 that monitors different entities in DNS and evaluates the reputations of these entities. For example, the framework can improve the detection accuracy of malicious domains, and the framework can also monitor the malicious activities based on passive DNS information (e.g., passive DNS data), as further described herein with respect to various embodiments. In some embodiments, the framework shown in FIG. 9 is implemented using a security cloud service, such as shown in and described above with respect to FIGS. 1 and 2.

In some embodiments, reputation generation using reputation engine 920 performs various techniques to generate/update reputations, such as described below. In some embodiments, a reputation generation framework is provided to evaluate/update the reputation for each DNS related entity (e.g., IP addresses 930, domains 932, NSs 934, BGP prefixes 936, and AS 938), such as shown in FIG. 9. For example, the reputation score can be used to identify malware domains (e.g., and/or potentially malicious domains) based on reputation and/or to track the maliciousness of a domain in a timely manner. As an example, two approaches can be used to evaluate the reputation of a domain, namely a DNS relation-based approach and a classification-based approach. Unlike existing machine-learning based approaches, the techniques described herein can leverage the DNS relation-based approach to detect malicious domains and cross-validate/correlate with the classification based approach. In particular, applying two different approaches to cross-validate the reputation of a domain improves the accuracy of the evaluation (e.g., decreases false positives and increases identification of malicious and/or potentially malicious domains).

In some embodiments, a DNS relation based approach is provided as described herein. The DNS relation based approach leverages the DNS RRs (e.g., stored in the pDNS DB 910) to discover relationships (if any) between two or more domains. The discovered relationships among domains can be used to construct a DNS relation graph and/or extend a malware association graph, such as further described below with respect to FIG. 10 (e.g., a malware association graph can be used to seed a graph that can be extended or expanded and clusters can be grown using the various techniques described herein). Using this graph, a reputation of new domains can be automatically determined based on associations or relationships with other nodes in the graph that have known reputations. For example, a new domain that has a relationship with a known malware IP address, such as if the new domain is known to resolve to that IP address, then the new domain can be determined to be a malware domain and/or a reputation score input can be generated to increase the maliciousness risks associated with the new domain.

In some embodiments, a DNS relation based approach includes relation discovery, relation sanitization, propagation of reputation, and update of reputation, as described in more detail below.

In some embodiments, relation discovery is provided as follows. Several types of relations are used to connect two domains (e.g., form an edge in a relation graph) based on the information in pDNS, such as described below with respect to FIG. 10. For example, if domain A and domain B are mapped to the same IP, then these domains can be deemed related. If domain A and domain B are hosted by the same name server (NS), then these domains can be deemed related. As another example, if domain A and domain B are originated from the same session (e.g., domain A and domain B are in two DNS responses that are from the same source and are within a short time period), then these domains can be deemed related. Accordingly, different types of relationships can form different types of edges in the graph (e.g., DNS relation graph and/or malware association graph) as further described herein.

In some embodiments, relation sanitization is provided as follows. Certain types of relationships can introduce false positives (e.g., falsely related domains). For example, an IP used for domain hosting or domain parking or a Content Delivery Network (CDN) can cause all the domains mapped to that IP to be considered as related. To filter out such invalid relationships, a filtering approach to identify IP/name server that are used for web hosting/domain parking/CDN can be applied. Given an IP/name server, all the mapped domains can be identified by querying pDNS DB. If a number of mapped domains suggest the IP/name server may be used for web hosting, then the content of the mapped domains can be retrieved to compare the similarity among the contents to confirm the usage of the IP/name server. For example, low similarity can be used to determine that such is a web hosting/CDN, and high similarity can be used to determine that such is domain parking.

In some embodiments, propagation of reputation is provided as follows. Given a domain relationship graph (e.g., a domain relationship graph can be just based on domain relationships as described with respect to FIG. 9, and/or a domain/DNS relation graph can extend a graph as further described below with respect to FIG. 10, also referred to herein as a malware association graph), a reputation propagation algorithm is provided to propagate the reputation score from a known reputation domain(s) to an unknown reputation domain(s). For example, the reputation propagation algorithm can assign different damping factors to different types of edges in the graph (e.g., as different types of edges can be formed by different relationships that can imply different confidence levels based on such different relationships as discussed above). As an example, given an unknown domain that is connected to known domain(s) via path(s), its propagated reputation can be provided by the weighted average of all the reputations of known domains multiplied by the damping factors along the path. For example, "foo.com" can be resolved to one IP and has one name server (NS). All the connections/relations: (a) it is mapped to the same IP as "a.com", the damping factor for this relation is 0.9, the total weight for this relation is 0.5; (b) it has the same name server as "a.com" and "b.com", the damping factor for this relation is 0.8, the total weight for this relation is 0.4; (c) it's IP belongs to the same BGP prefix with "c.com", "a.com", "b.com" and"d.com", the damping factor in this relation is 0.2, the total weight for this relation is 0.05; (d) it's IP belongs to the same AS as "a.com", "b.com" and "c.com", the damping factor for this relation is 0.3, the total weight for this relation is 0.05. In total, it is related to 4 different domains in 10 relations. As a result, it's weighted score can be calculated using the following: sum(type_weight*score_of_each_type_of_relation). For each type, score_each_type_of_relation=sum(damping factor*relation_in_this_type). As would now be apparent to one of ordinary skill in the art, various weighted average techniques using various other factors (e.g., damping factors) can similarly be applied to perform such reputation propagation algorithm techniques as described herein.

In some embodiments, update of reputation is provided as follows. When the reputation of a domain is modified based on external information, the reputation of related domains is updated.

In some embodiments, a classification based approach is provided as described herein. In particular, the classification based approach calculates the reputation of an unknown domain based on a set of features. For example, these features can be summarized into three categories: 1) temporal-based features; 2) location-based features: and 3) record-based features.

In some embodiments, a classification based approach is provided to generate reputations for IP addresses using passive DNS data. Unlike existing approaches that are based on evidence of malicious activities observed in an IP to evaluate reputation, techniques described herein use, for example, three categories of new features using DNS data and public information, such as WHOIS and Geo-IP related information. For example, a mapped domains category focuses on the set of domains hosted on an IP. This set can be obtained from the pDNS DB 910. As an example, features can include: 1) the number of the domains; 2) the weighted reputation of the domains; and 3) the diversity of domains. The diversity of domains can be measured in terms of diversity of domain names, diversity of the page content of the domains, and/or diversity of the functionality of the domains. For example, a register and Geo-IP information category leverages the external information about an IP (e.g., register information and Geo-IP information). As an example, features can include: 1) commercial used IP or residential used IP (e.g., residential used IPs are normally not intended for web hosting); 2) Geo-location (e.g., country and/or region) of the IP (e.g., IP has a poor reputation if it is located in a region that is frequently involved in malicious activities); and 3) owner information of the IP (e.g., the Internet Service Provider (ISP)). For example, a topology information category can include: 1) the number of BGP prefixes that include the IP; and 2) the number of AS that include and/or are related to the IP. In some embodiments, by applying various machine learning techniques (MLT) on these features, reputation for each IP address is generated (e.g., random forest, support vector machine (SVM), and/or other MLT and/or heuristic techniques can be used).

In some embodiments, name server reputations are generated using the reputation engine 910. For example, reputations for name servers in DNS are generated and/or updated using various techniques described herein. For example, a reputation for a name server can be calculated as a weighted average of all the domain names resolved by the name server.

In some embodiments, BGP prefix reputations and AS reputations are generated using the reputation engine 910. For example, a reputation of a BGP prefix or an AS can be provided by an aggregation of the reputation of its element. More specifically, the reputation of a BGP prefix can be aggregated from the IPs in the prefix. The reputation of an AS can be aggregated from the BGP prefixes originated by the AS.

Figure 10:
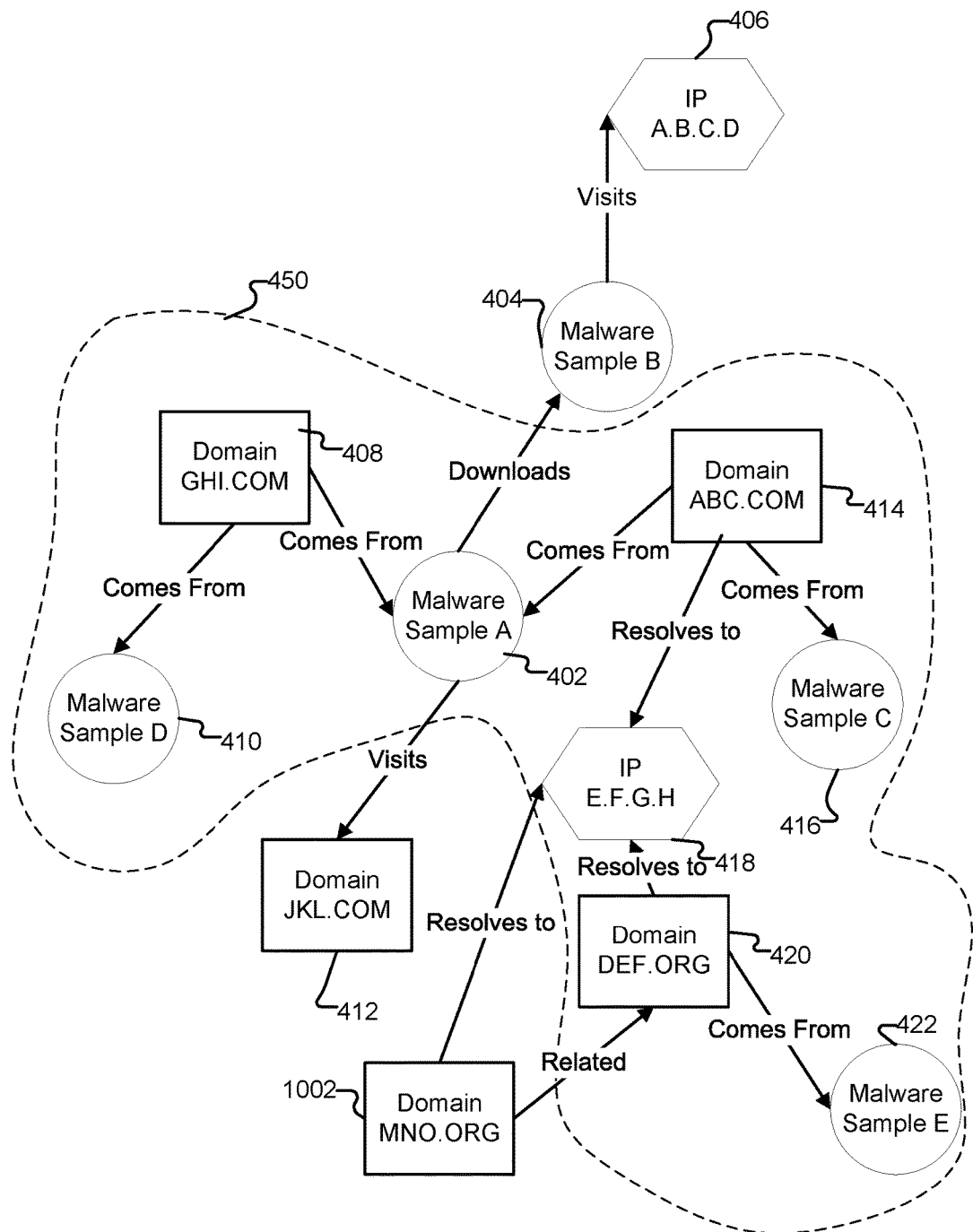
FIG. 10 is a directed graph diagram illustrating malware detection using clustering with malware source information and using passive Domain Name Service (DNS) information in accordance with some embodiments.

FIG. 10 is a directed graph diagram illustrating malware detection using clustering with malware source information and using passive Domain Name Service (DNS) information in accordance with some embodiments. The malware association graph shown in FIG. 10 is similar to the malware association graph of FIG. 4 but is extended using passive DNS information using various techniques described herein. In particular, passive DNS information includes information that new domain MNO.ORG 1002 also resolves to IP E.F.G.H 418, such that the malware association graph can be extended to include the resolves to relationship between domain MNO.ORG 1002 resolves to IP E.F.G.H 418 as shown. For example, if IP E.F.G.H 418 is known or determined to be a bad IP address (e.g., associated with malware, such as using various techniques described herein based on the association of the IP address with the cluster 450), then based on this passive DNS information that domain MNO.ORG also resolves to this bad IP address, the domain MNO.ORG 1002 can be determined to be a malware domain and/or this can be an input to the domain reputation for the domain MNO.ORG 1002 using various techniques described herein. If the domain MNO.ORG 1002 is determined to be a malware domain (e.g., reputation score for the domain exceeds a threshold using various techniques described herein), then the malware group or cluster 450 can be extended to include the domain MNO.ORG 1002. Also, given that domain MNO.ORG 1002 and domain DEF.ORG 420 are mapped to the same IP E.F.G.H 418, then these domains can also be deemed to be related as shown.

As will now be apparent, various other DNS relationships can be determined using passive DNS information to extend the directed graph shown in FIG. 10 as described herein with respect to various embodiments. Thus, using passive DNS information can facilitate an accurate growth of malware groups/clusters (e.g., the malware group/cluster 450) to include domains that are determined to be associated malware domains using various techniques described herein.

In some embodiments, using various techniques described herein, passive DNS information can facilitate identification of bad DNS name servers. For example, bad name servers or malicious name servers can refer to name servers that are determined to resolve malware domains to malware IPs (e.g., each name server can also have its own reputation score, such as score=sum(domain_reputation_score)/number_of_domains)).

Thus, a malware association graph can be extended or grown using various passive DNS techniques described herein. For example, as described herein, if domain A and domain B are mapped to the same IP, then these domains can be deemed related and edges representing such a relationship can be provided in the graph (e.g., as shown in FIG. 10 with respect to domains 420 and 1002 mapping to the same IP 418). If domain A and domain B are hosted by the same name server (NS), then these domains can be deemed related and edges representing such a relationship can also be provided as an edge relationship between such nodes in the graph. If domain A and domain B are originated from the same session (e.g., domain A and domain B are in two DNS responses that are from the same source and are within a short time period), then these domains can be deemed related and edges representing such a relationship can be provided in the graph. Accordingly, different types of relationships can form different types of edges between respective nodes in the malware association graph, which can then be used to facilitate malware domain detection using passive DNS using techniques described herein in accordance with various embodiments.

Figure 11:
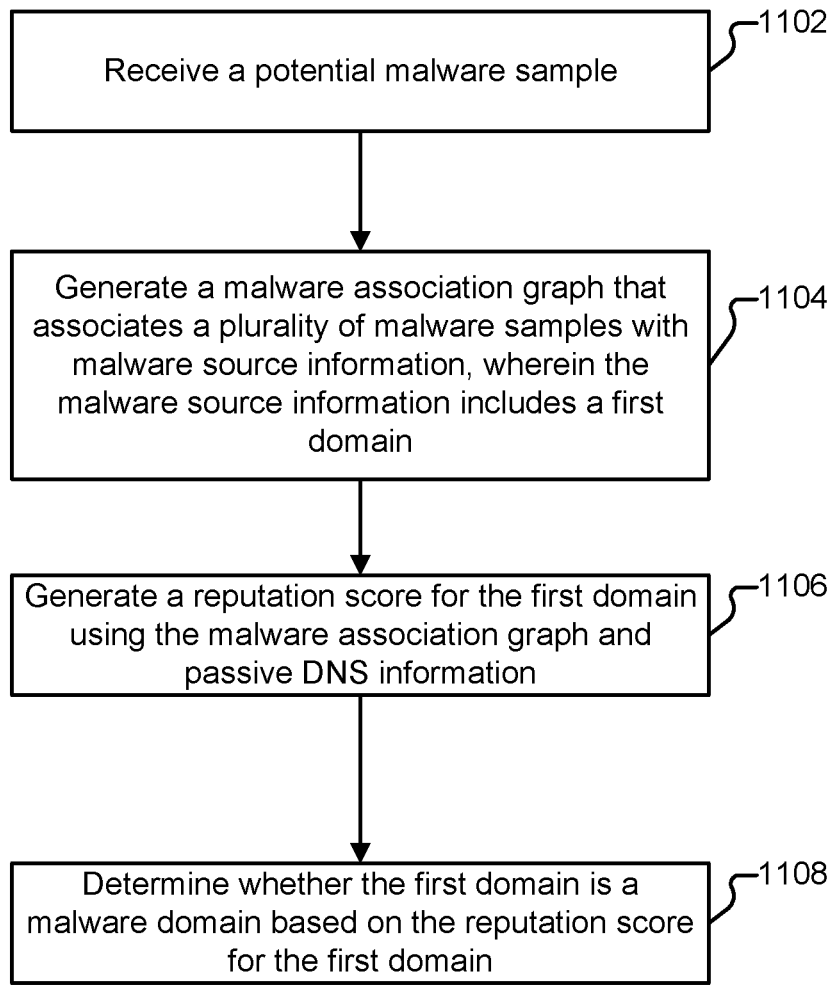
FIG. 11 is flow diagram illustrating malware domain detection using passive Domain Name Service (DNS) in accordance with some embodiments.

FIG. 11 is flow diagram illustrating malware domain detection using passive Domain Name Service (DNS) in accordance with some embodiments. At 1102, a potential malware sample is received (e.g., at a security cloud service that performs malware domain detection using passive DNS data). At 1104, generating a malware association graph that associates a plurality of malware samples with malware source information is performed, in which the malware source information includes a first domain. At 1106, generating a reputation score for the first domain using the malware association graph and passive DNS information is performed. At 1108, determining whether the first domain is a malware domain based on the reputation score for the first domain is performed.

Figure 12:
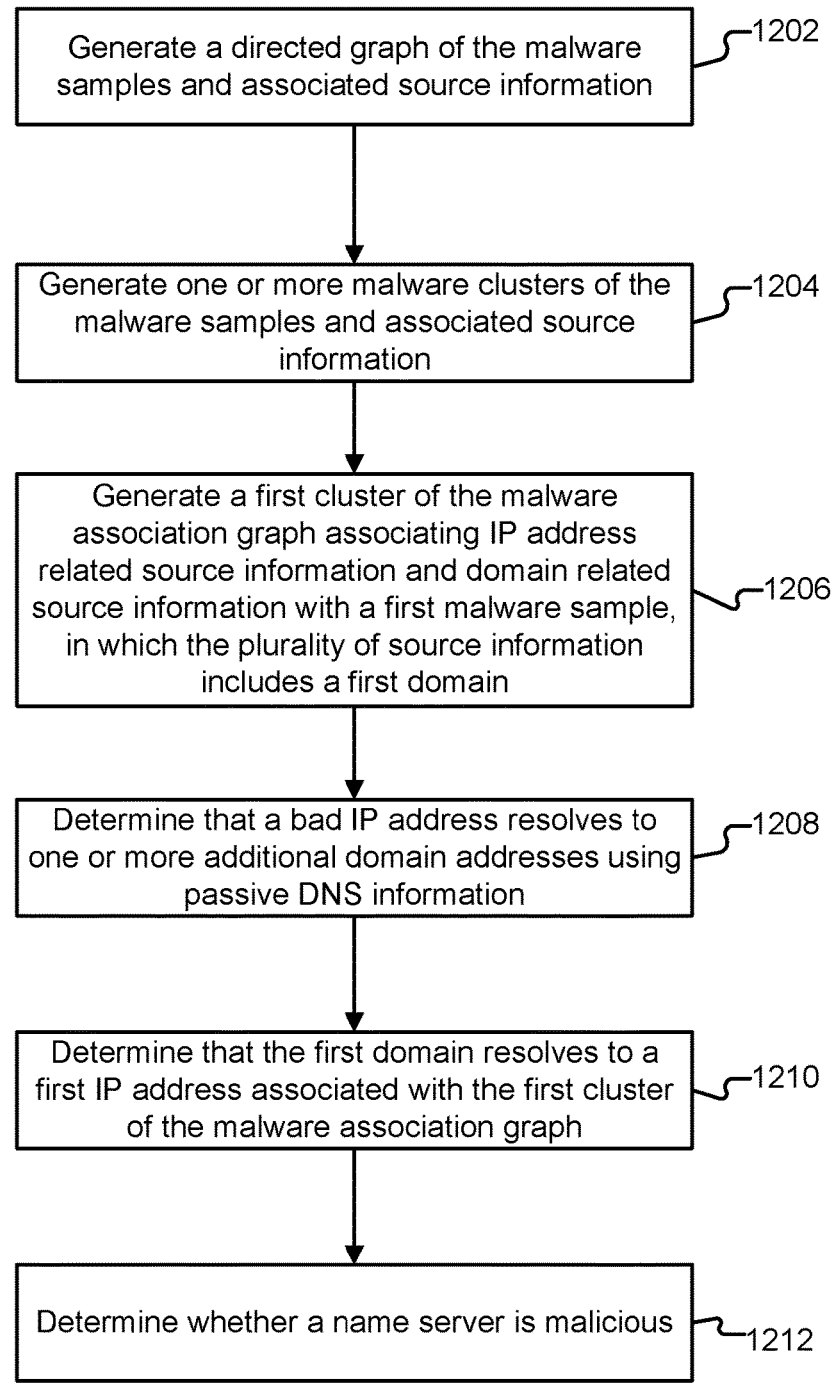
FIG. 12 is another flow diagram illustrating malware domain detection using passive Domain Name Service (DNS) in accordance with some embodiments.

FIG. 12 is another flow diagram illustrating malware domain detection using passive Domain Name Service (DNS) in accordance with some embodiments. At 1202, generating a directed graph of the malware samples and associated source information is performed. At 1204, generating one or more malware clusters of the malware samples and associated source information is performed (e.g., using clustering engine of a security cloud service that performs malware domain detection using passive DNS data). At 1206, generating a first cluster of the malware association graph associating IP address related source information and domain related source information with a first malware sample is performed, in which the plurality of source information includes a first domain. At 1208, determining that a bad IP address (e.g., an IP address determined to be associated with malware) resolves to one or more additional domain addresses using passive DNS information is performed. At 1210, determining that the first domain resolves to a first IP address associated with the first cluster of the malware association graph is performed. At 1212, determining whether a name server is malicious is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for malware domain detection using passive Domain Name Service (DNS), comprising:
    a processor; and
    a memory coupled with the processor, wherein the memory is configured to provide the processor with instructions which when executed cause the processor to:
        generate a malware association graph that associates a plurality of malware samples with malware source information, wherein the malware association graph includes a searchable directed graph that associates related Internet Protocol (IP) address information and related domain information with a first malware sample, and wherein the malware source information includes a first domain of the malware association graph, the first domain being associated with the first malware sample;
        generate a reputation score for the first domain using the malware association graph and passive DNS information, wherein the generating of the reputation score comprises to:
            identify a first path and a second path both linking the first domain to a known malware node of the malware associate graph, the first path having a first relation type and the second path having a second relation type, each relation type being associated with resolving to the same Internet Protocol (IP) address of the known malware node, resolving using the same name server (NS) as the known malware node, having an IP address belonging to the same border gateway protocol (BGP) prefix as the known malware node, having an IP address belonging to the same autonomous system (AS) as the known malware node, or any combination thereof, the first relation type being different from the second relation type;

determine, for the first relation type, a first score based on a first damping factor associated with the first relation type and the first relation type;

weigh the first score by a first weight to obtain a first weighted reputation;

determine, for the second relation type, a second score based on a second damping factor associated with the second relation type and the second relation type;

weigh the second score by a second weight to obtain a second weighted reputation; and generate the reputation score of the first domain based at least in part on the first weighted reputation and the second weighted reputation;

determine whether the first domain is a malware domain based on the reputation score for the first domain; and in response to a determination that the first domain is the malware domain, perform a responsive action, wherein the response action includes generate a new signature for a new malware, generate an alert and/or a notification to a user, or a combination thereof, and associate the new malware with the malware domain.

2. The system recited in claim 1, wherein the reputation score is based at least in part on a determination that the first domain resolves to a first Internet Protocol (IP) address associated with a first cluster in the malware association graph, and wherein the first domain is determined to be a malware domain if the reputation score for the first domain exceeds a threshold value.

3. The system recited in claim 1, wherein a first cluster of the malware association graph associates related Internet Protocol (IP) address information and related domain information with the first malware sample.

4. The system recited in claim 1, wherein the processor is further configured to:
determine that a bad Internet Protocol (IP) address resolves to one or more additional domain addresses using passive DNS information.

5. The system recited in claim 1, wherein the processor is further configured to:
determine that the first domain resolves to a first Internet Protocol (IP) address associated with a first cluster of the malware association graph.

6. The system recited in claim 1, wherein the processor is further configured to:
determine that the first domain is associated with malware based on a first cluster of the malware association graph.

7. The system recited in claim 1, wherein the processor is further configured to:
generate a first cluster of the malware association graph associating a plurality of source information with the first malware sample, wherein the plurality of source information includes the first domain.

8. The system recited in claim 1, wherein the processor is further configured to:
generate a first cluster of the malware association graph associating Internet Protocol (IP) address related source information and domain related source information with the first malware sample, wherein the IP address related source information includes the first domain.

9. The system recited in claim 1, wherein the processor is further configured to:
determine whether a DNS name server is malicious.

10. A method of malware domain detection using passive Domain Name Service (DNS), comprising:
generating, using a hardware processor, a malware association graph that associates a plurality of malware samples with malware source information, wherein the malware association graph includes a searchable directed graph that associates related Internet Protocol (IP) address information and related domain information with a first malware sample, and wherein the malware source information includes a first domain of the malware association graph, the first domain being associated with the first malware sample;

generating, using the hardware processor, a reputation score for the first domain using the malware association graph and passive DNS information, wherein the generating of the reputation score comprises:
identifying a first path and a second path both linking the first domain to a known malware node of the malware associate graph, the first path having a first relation type and the second path having a second relation type, each relation type being associated with resolving to the same Internet Protocol (IP) address of the known malware node, resolving using the same name server (NS) as the known malware node, having an IP address belonging to the same border gateway protocol (BGP) prefix as the known malware node, having an IP address belonging to the same autonomous system (AS) as the known malware node, or any combination thereof, the first relation type being different from the second relation type;

determining, for the first relation type, a first score based on a first damping factor associated with the first relation type and the first relation type;

weighing the first score by a first weight to obtain a first weighted reputation;

determining, for the second relation type, a second score based on a second damping factor associated with the second relation type and the second relation type;

weighing the second score by a second weight to obtain a second weighted reputation; and generating the reputation score of the first domain based at least in part on the first weighted reputation and the second weighted reputation;

determining, using the hardware processor, whether the first domain is a malware domain based on the reputation score for the first domain; and in response to a determination that the first domain is the malware domain, performing a responsive action, wherein the response action includes generating a new signature for a new malware, generating an alert and/or a notification to a user, or a combination thereof, and associating the new malware with the malware domain.

11. The method of claim 10, wherein the reputation score is based at least in part on a determination that the first domain resolves to a first Internet Protocol (IP) address associated with a first cluster in the malware association graph, and wherein the first domain is determined to be a malware domain if the reputation score for the first domain exceeds a threshold value.

12. The method of claim 10, further comprising:
determining that a bad Internet Protocol (IP) address resolves to one or more additional domain addresses using passive DNS information.

13. The method of claim 10, further comprising:
determining that the first domain resolves to a first Internet Protocol (IP) address associated with a first cluster of the malware association graph.

14. The method of claim 10, further comprising:
determining whether a DNS name server is malicious.

15. A computer program product for malware domain detection using passive Domain Name Service (DNS), the computer program product being embodied in a tangible non-transitory computer readable storage medium and comprising computer instructions for:
generating a malware association graph that associates a plurality of malware samples with malware source information, wherein the malware association graph includes a searchable directed graph that associates related Internet Protocol (IP) address information and related domain information with a first malware sample, and wherein the malware source information includes a first domain of the malware association graph, the first domain being associated with the first malware sample;
generating a reputation score for the first domain using the malware association graph and passive DNS information, wherein the generating of the reputation score comprises:
identifying a first path and a second path both linking the first domain to a known malware node of the malware associate graph, the first path having a first relation type and the second path having a second relation type, each relation type being associated with resolving to the same Internet Protocol (IP) address of the known malware node, resolving using the same name server (NS) as the known malware node, having an IP address belonging to the same border gateway protocol (BGP) prefix as the known malware node, having an IP address belonging to the same autonomous system (AS) as the known malware node, or any combination thereof, the first relation type being different from the second relation type,
determining, for the first relation type, a first score based on a first damping factor associated with the first relation type and the first relation type;
weighing the first score by a first weight to obtain a first weighted reputation;
determining, for the second relation type, a second score based on a second damping factor associated with the second relation type and the second relation type;
weighing the second score by a second weight to obtain a second weighted reputation; and
generating the reputation score of the first domain based at least in part on the first weighted reputation and the second weighted reputation;
determining whether the first domain is a malware domain based on the reputation score for the first domain; and
in response to a determination that the first domain is the malware domain, performing a responsive action, wherein the response action includes generating a new signature for a new malware, generating an alert and/or a notification to a user, or a combination thereof, and associating the new malware with the malware domain.

16. The computer program product recited in claim 15, wherein the reputation score is based at least in part on a determination that the first domain resolves to a first Internet Protocol (IP) address associated with a first cluster in the malware association graph, and wherein the first domain is determined to be a malware domain if the reputation score for the first domain exceeds a threshold value.

17. The computer program product recited in claim 15, further comprising computer instructions for:
determining that a bad Internet Protocol (IP) address resolves to one or more additional domain addresses using passive DNS information.

18. The computer program product recited in claim 15, further comprising computer instructions for:
determining that the first domain resolves to a first Internet Protocol (IP) address associated with a first cluster of the malware association graph.

19. The computer program product recited in claim 15, further comprising computer instructions for:
determining whether a DNS name server is malicious.

* * * * *